July 10, 1923.
H. K. HANSEN
WOODCUTTER SIZER HEAD
Filed Oct. 6, 1921
1,461,090
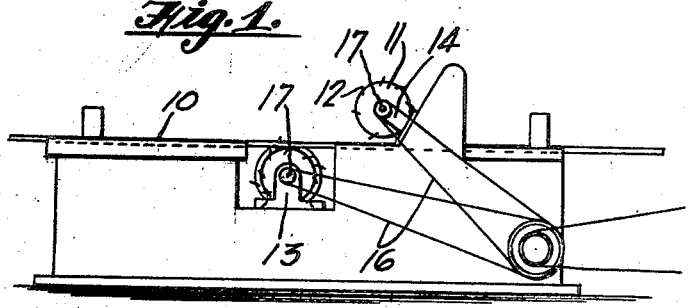
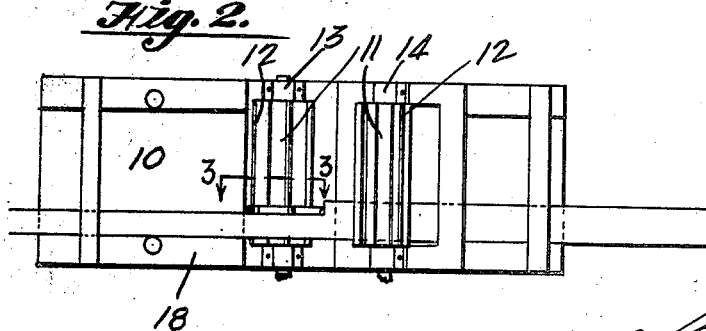
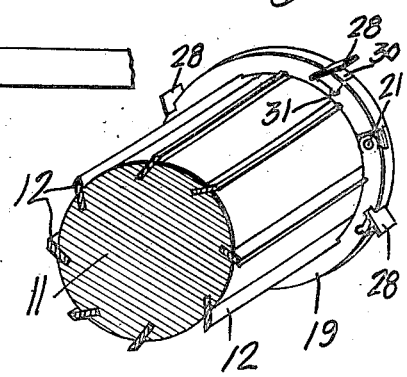
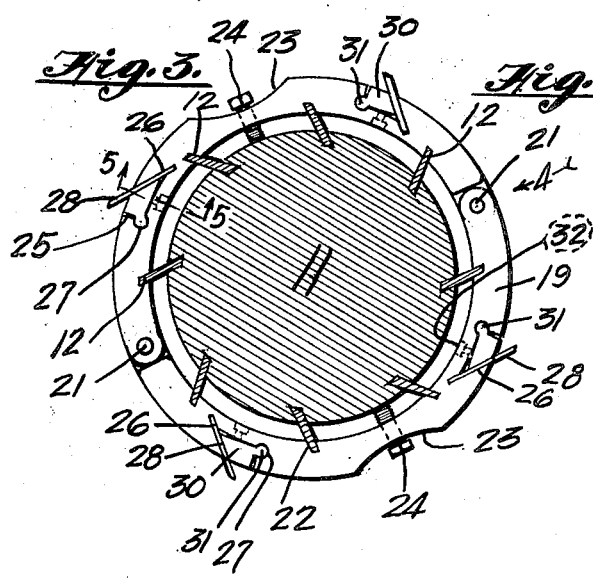
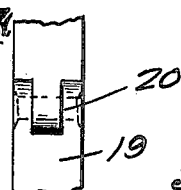
INVENTOR.
Hans K. Hansen
BY
Hazard & Miller
ATTORNEYS Patented July 10, 1923.

1,461,090

UNITED STATES PATENT OFFICE.

HANS K. HANSEN, OF SAN PEDRO, CALIFORNIA.

WOODCUTTER SIZER HEAD.

Application filed October 6, 1921. Serial No. 505,754.

*To all whom it may concern:*

Be it known that I, HANS K. HANSEN, a citizen of the United States, residing at San Pedro, in the county of Los Angeles and State of California, have invented new and useful Improvements in Woodcutter Sizer Heads, of which the following is a specification.

My invention relates generally to lumber trimming machinery and more particularly to a sizer head that is adapted to be positioned on one of the cutters of a lumber trimming machine for cutting or trimming off one edge of the lumber as it passes through the machine thereby cutting the lumber to the proper width at the same time that the upper and lower faces of the lumber are planed or finished by the rotary planing members.

The principal objects of my invention are to provide a relatively simple and practical form of sizer head that may be easily and quickly applied to and removed from one of the rotary cutting members of a lumber finishing machine, to provide a sizer head that may be readily adjustable upon the rotary cutter so as to regulate the finished width of the lumber that is engaged by said sizer head and further to provide a sizer head with readily removable blades and cutting members and which construction permits said blades to be removed and sharpened and replaced by new blades when the old ones become broken or worn so as to be unfit for service.

With the foregoing and other objects in view my invention consists in certain novel features of construction and arrangement of parts that will be hereinafter more fully described and claimed and illustrated in the accompanying drawings in which:

Fig. 1 is a side elevational view of a lumber trimming machine of my improved construction.

Fig. 2 is a top plan view of the machine.

Fig. 3 is an enlarged cross section taken on the line 3—3 of Fig. 2.

Fig. 4 is an enlarged elevational view of the parts of the sizer head seen looking in the direction indicated by the arrow 4 of Fig. 3.

Fig. 5 is an enlarged cross section taken approximately on the line 5—5 of Fig. 3.

Fig. 6 is a perspective view showing my improved sizer head in position upon the rotary member of a lumber trimming machine.

Referring by numerals to the accompanying drawings which illustrate a practical embodiment of my invention, 10 designates the table of a lumber trimming machine and arranged transversely thereupon is a pair of horizontally disposed cutter heads each comprising a cylindrical body such as 11 having seated in its periphery, a series of blades or cutting members 12 that are adapted to engage the surfaces of lumber as it passes over the table 10. One of these rotary cutting heads is arranged for operation in a suitable frame 13 that is positioned below the surface of the table 10, so that the edges of its cutting members 12 engage the under surface of the lumber that is moved over the table. The other rotary cutting member is mounted for operation in a suitable frame 14 and said last mentioned cutter occupies a position above the table so that the edges of its blades or cutting members engages the upper surface of the lumber as it passes through the machine. Both of the rotary cutters just described are adapted to be adjusted vertically by suitable means associated with the frames 13 and 14.

The rotary cutters are driven in any suitable manner preferably by means of belts such as 16 that pass around pulleys 17 and which latter are secured to the shafts or trunnions of the rotary cutters. Secured on top of the table 10 adjacent to one of the side edges thereof, is a guide rail 18 against which one edge of the lumber engages as it passes over the table.

The sizer head contemplated by my invention comprises a ring-shaped member 19 that is formed in two or more parts, the ends thereof having overlapping portions 20 that are secured to each other by readily detachable pins or screws 21 and formed in the inner face of this ring-shaped member are suitably located notches 22 that are adapted to receive the outer ends of the blades 12 of the rotary cutter upon which the sizer head is positioned.

Formed in the outer faces of the member 19 and preferably at diametrically opposite points, are recesses 23 and passing through the ring-shaped member at the points where said recesses are formed are set screws 24, the inner ends of which are adapted to bear against the periphery of the cylindrical body 11 of the rotary cutter to which the sizer head is applied and the heads of said set screws occupy positions within said recesses 23.

Formed in the ring-shaped member 19 and preferably arranged at equal distances apart are notches or recesses 25, one end of each recess being inclined and provided with an inwardly projecting inclined slot 26. Formed at the opposite end of recess 25 and at the bottom thereof is a relatively small circular recess 27. Removably positioned in each inclined slot 26 and the corresponding end of the recess 25 is an inclined blade or cutting member 28 that projects a short distance beyond the periphery of the member 19 and beyond one of the side faces thereof as illustrated in Fig. 5.

The means illustrated for clamping each blade in position upon the member 19 comprises a metal block 30 that fits loosely within the recess 25 and said block being provided at one end with an inclined face that bears directly against the under face of the blade or cutting member 28.

Formed integral with the opposite end of block 30 and at the inner corner thereof, is a small transversely disposed cylindrical lug 31 that occupies the corresponding recess 27 when the parts are properly assembled for use. Each block 30 is forced into clamping engagement with the corresponding blade 28 by a set screw 32 that passes through the member 19 immediately beneath each recess 25 therein. The parts just described provide simple and effective means for firmly securing the blades 28 to the member 19 and permits the ready removal of said blades when it becomes necessary to sharpen the same.

The sizer head thus constructed is mounted on the rotary cutter that occupies a position below the table 10 and said sizer head is clamped to the rotary cutter after proper adjustment by tightening the set screws 24. The sizer head is adjusted on the rotary cutter a predetermined distance away from guide rail 18 and as the pieces of lumber such as flooring and the like are passed over the table 10, the upper and lower faces of said pieces of lumber will be engaged by the blades 12 of the rotary cutters and finished to the desired smooth condition and at the same time the cutters 28 of the sizer head will engage the edge of the lumber thereby trimming off said edge and cutting the lumber to the proper width.

A sizer head of my improved construction is relatively simple, may be easily and cheaply produced and is very effective in performing its intended functions.

It will be understood that minor changes in the form, size and construction of the various parts of my improved sizer head may be made and substituted for those herein shown and described, without departing from the spirit of my invention, the scope of which is set forth in the appended claims.

I claim as my invention:

1. The combination with a rotary cutter head, of a ring shaped member, means for clamping said ring shaped member upon the rotary cutter head, a series of blades detachably seated in said ring-shaped member, and projecting beyond the periphery thereof, and means for clamping said blades to said ring-shaped member.

2. In combination, a rotary cutter head having blades projecting from the periphery of the head, and a sizer head comprising a body of annular form and including sections detachably connected to each other and recessed on their inner peripheries to receive said blades, and blades carried by and projecting from the outer periphery of the body.

3. A sizer head comprising a body of annular form having its inner periphery provided at intervals with recesses adapted to receive the blades of a rotary cutter head, and blades extending from the outer periphery of said body and detachably associated therewith.

4. A sizer head comprising an annular body composed of sections detachably connected to each other at their ends and formed on their inner periphery with recesses, blocks pivoted in the body, blades carried by the body, and adjustable means engageable with the blocks for causing the latter to clampingly engage said blades.

5. A sizer head comprising an annular body, means carried by the body adapted to secure the same upon a rotary cutter head, and blades detachably secured to the body and projecting from the periphery thereof.

6. A sizer head comprising an annular body having recesses formed on the inner periphery thereof, set screws mounted in the body and adapted to engage the body of a rotary cutter head for detachably securing the annular body to the head, and blades detachably mounted in the annular body and projecting from the outer periphery thereof.

In testimony whereof I have signed my name to this specification.

HANS K. HANSEN.